(12) United States Patent
Tanaka

(10) Patent No.: US 7,898,697 B2
(45) Date of Patent: Mar. 1, 2011

(54) PRINTING DEVICE, ELECTRONIC DOCUMENT MANAGEMENT SYSTEM, PRINTING MEDIUM, PRINT PROCESSING METHOD, AND PROGRAM

(75) Inventor: Kei Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 536 days.

(21) Appl. No.: 11/217,130

(22) Filed: Sep. 1, 2005

(65) Prior Publication Data

US 2006/0268288 A1 Nov. 30, 2006

(30) Foreign Application Priority Data

May 25, 2005 (JP) ................................ P2005-152527

(51) Int. Cl.
*H04N 1/40* (2006.01)
*G06F 3/12* (2006.01)
(52) U.S. Cl. ...................................... 358/3.28; 358/1.15
(58) Field of Classification Search ................. 358/3.28, 358/1.15
See application file for complete search history.

(56) References Cited

U.S. PATENT DOCUMENTS

| 6,752,317 | B2 * | 6/2004 | Dymetman et al. | 235/462.45 |
| 7,099,522 | B2 * | 8/2006 | Anderson et al. | 382/287 |
| 2002/0065853 | A1 * | 5/2002 | Takahashi et al. | 707/527 |
| 2002/0070281 | A1 | 6/2002 | Nimura et al. | 235/494 |
| 2003/0020945 | A1 * | 1/2003 | Lopez et al. | 358/1.15 |
| 2005/0006480 | A1 * | 1/2005 | Talluri et al. | 235/468 |
| 2005/0052700 | A1 * | 3/2005 | Mackenzie et al. | 358/1.18 |
| 2005/0094186 | A1 * | 5/2005 | Silverbrook et al. | 358/1.14 |
| 2005/0188306 | A1 * | 8/2005 | Mackenzie | 715/530 |
| 2005/0243369 | A1 * | 11/2005 | Goldstein et al. | 358/1.18 |
| 2006/0242561 | A1 * | 10/2006 | Wang et al. | 715/513 |
| 2007/0086032 | A1 * | 4/2007 | Gonzalez et al. | 358/1.12 |

FOREIGN PATENT DOCUMENTS

| EP | 469864 A2 * | 2/1992 |
| JP | 2000-293303 | 10/2000 |
| JP | 2002-240387 | 8/2002 |
| JP | 2003-186238 | 7/2003 |
| JP | 2004-094907 | 3/2004 |
| WO | WO 01/48685 | 7/2001 |
| WO | WO 2004/038651 | 5/2004 |

* cited by examiner

*Primary Examiner* — Twyler L Haskins
*Assistant Examiner* — Fred Guillermety
(74) *Attorney, Agent, or Firm* — Morgan, Lewis & Bockius LLP

(57) ABSTRACT

A printing device includes an electronic document acquisition unit that acquires an electronic document to be printed on a medium, a code information generation unit that generates code information including information for uniquely specifying a medium on which a document image of the electronic document acquired by the electronic document acquisition unit is printed and address information within the medium, a code image generation unit that converts the code information generated by the code information generation unit into a print image to generate a code image, a document image generation unit that generates the document image from the electronic document, and a printing unit that prints the generated code image and the document image on a surface of the medium.

13 Claims, 11 Drawing Sheets

FIG. 6

| MANAGE-MENT ID | ELECTRONIC DOCUMENT NAME | PAGE-INFOR-MATION | USED ADDRESS (START) | USED ADDRESS (LAST) | PRINT-OUT TIME | ELECTRONIC DOCUMENT SIZE | PAPER SIZE | MAGNI-FICATION RATIO (%) | Nup INFOR-MATION |
|---|---|---|---|---|---|---|---|---|---|
| 1 | docserver1.fujixerox.co.jp/Cabinet1/drawer1/folder1/document1.ppt | 1 | 1 | 60900 | 2005/1/1 10:10:15 | A4 | A4 | 100 | 1 |
| 2 | docserver1.fujixerox.co.jp/Cabinet1/drawer1/folder1/document1.ppt | 2 | 60901 | 121800 | 2005/1/1 10:10:16 | A4 | A4 | 100 | 1 |
| 3 | docserver1.fujixerox.co.jp/Cabinet1/drawer1/folder1/document1.ppt | 3 | 121801 | 182700 | 2005/1/1 10:10:17 | A4 | A4 | 100 | 1 |
| 4 | docserver1.fujixerox.co.jp/Cabinet1/drawer1/folder1/document1.ppt | 4 | 182701 | 243600 | 2005/1/1 10:10:18 | A4 | A4 | 100 | 1 |
| 5 | docserver1.fujixerox.co.jp/Cabinet1/drawer1/folder1/document1.ppt | 5 | 243601 | 304500 | 2005/1/1 10:10:19 | A4 | A4 | 100 | 1 |
| 6 | docserver1.fujixerox.co.jp/Cabinet1/drawer1/folder1/document1.ppt | 6 | 304501 | 365400 | 2005/1/1 10:10:20 | A4 | A4 | 100 | 1 |
| 7 | docserver1.fujixerox.co.jp/Cabinet1/drawer1/folder1/document2.ppt | 1 | 1 | 60900 | 2005/1/1 10:10:21 | A4 | A4 | 100 | 1 |
| 8 | docserver1.fujixerox.co.jp/Cabinet1/drawer1/folder1/document2.ppt | 2 | 60901 | 182700 | 2005/1/1 10:10:22 | A3 | A3 | 100 | 1 |
| 9 | docserver1.fujixerox.co.jp/Cabinet1/drawer1/folder1/document3.ppt | 1 | 1 | 60900 | 2005/1/1 10:10:23 | A3 | A4 | 70 | 2 |
| 10 | docserver1.fujixerox.co.jp/Cabinet1/drawer1/folder1/document3.ppt | 2 | 60901 | 121800 | 2005/1/1 10:10:24 | A3 | A4 | 70 | 2 |

PRINTING DEVICE, ELECTRONIC DOCUMENT MANAGEMENT SYSTEM, PRINTING MEDIUM, PRINT PROCESSING METHOD, AND PROGRAM

BACKGROUND OF THE INVENTION

1. Field of the Invention

The present invention relates to a printing device, such as a copier or a printer, to an electronic document management system which manages electronic documents to be printed by such a printing device, and to a program.

2. Description of the Related Art

Recently, a technique is attracting attention in which a user is allowed to send data, such as characters or figures recorded on a special paper with minute dots printed thereon, to a personal computer or a mobile phone, such that data can be preserved or be sent by mail. With this technique, small dots are printed on the special paper, for example, at intervals of about 0.3 mm, such that different patterns can be drawn, for example, for each grid having a predetermined size. Accordingly, it is possible to specify addresses for data, such as characters recorded on the special paper by reading the patterns, for example, using a special ball-point pen equipped with a digital camera. As a result, handwritten characters recorded on the paper can be used as electronic information.

As a technique according to the related art, a technique has been known in which added information is correlated with information before writing on a medium in real time without using a tablet, by detecting coordinates of a written trajectory on the medium, for example, by decoding a code symbol indicating a coordinate on the medium and by detecting a position of a point on the medium using the position, direction, and distortion of the code symbol, or the like (for example, see JP-A-2000-293303).

In addition, a technique has been known in which a two-dimensional code pattern to be printed together with documents on demand using a typical general-purpose printer is provided (for example, see JP-A-2004-94907). In JP-A-2004-94907, since the two-dimensional code has identification information for identifying a document page, information added by hand in a printed document can be reflected in an original document.

In the technique disclosed in JP-A-2000-293303, coordinate information is provided on a paper on which document information is printed and is read, and an original document is correlated with the coordinate information. Thus, since the coordinate information needs to be recorded on the paper in advance, a special paper is needed. In addition, in order to correlate the original document with the coordinate information, a device for reading two-dimensional codes at the time of printing needs to be separately provided. Otherwise, it is not possible to manage the relation between documents and printing.

Also, in the technique disclosed in JP-A-2004-94907, when a document is printed, a two-dimensional code is also printed using a typical printing device without preparing a paper with the two-dimensional code printed thereon. The two-dimensional code is generated as a two-dimensional code pattern for the page of the document to be printed by receiving a document page ID for each page with reference to a document management database. However, in JP-A-2004-94907, the management is performed by correlating the document surface ID for each page of the printed document with the page of the printed document. Thus, when plural copies of the same document are printed, the copies have the same document surface ID. Accordingly, it is not possible to manage the copies individually.

Also, the position information of JP-A-2004-94907 is assigned among position information collectively managed in advance, instead of being generated at the time of printing. Thus, there is a strict limitation on position information to be selected.

The present invention has been made in view of the above circumstances and provides a printing device that is capable of printing different medium specification information for each medium, even when plural copies of a document image of the same electronic document are printed.

SUMMARY OF THE INVENTION

According to an aspect of the present invention, a printing device includes an electronic document acquisition unit that acquires an electronic document to be printed on a medium, a code information generation unit that generates code information including information for uniquely specifying a medium on which a document image of the electronic document acquired by the electronic document acquisition unit is printed and address information within the medium, a code image generation unit that converts the code information generated by the code information generation unit into a print image to generate a code image, a document image generation unit that generates the document image from the electronic document, and a printing unit that prints the generated code image and the document image on a surface of the medium.

According to an aspect of the present invention, an electronic document management system includes a print instruction unit that issues a print instruction to print an electronic document, a code image generation unit that at the time of printing on a medium generates a code image to be printed on a surface of the medium on which a document image of the electronic document is printed, the code image including address information for specifying a position of the surface of the medium and identification information for uniquely specifying the medium, a document image generation unit that generates the document image from the inputted electronic document, a printing unit that prints the generated code image and the generated document image on the surface of the medium, an electronic document management unit that manages a correlation between the identification information generated by the code image generation unit and the electronic document, and an accumulation unit that accumulates information concerning the correlation to be managed by the electronic document management unit.

According to still another aspect of the present invention, a printing medium includes a first image in which an electronic document is printed in a visible image based on an instruction of a user, and a second image that is formed in a non-visible image on a side of an image surface including a region, in which the first image is formed when the first image is printed, and has identification information for uniquely specifying the medium and address information concerning consecutive addresses.

According to a further aspect of the present invention, a print processing method of printing a document image of an electronic document instructed to be printed, the print processing method includes generating identification information for uniquely specifying a medium when the document image is printed on the medium, generating a code image that includes the generated identification information and address information for specifying a position of a surface of the medium, and storing information concerning a correlation between the identification information included in the code image and the electronic document.

According to still another aspect of the present invention, there is provided a storage medium readable by a computer, the storage medium storing a program of instructions executable by the computer to perform a print processing function, the function comprising the steps of receiving information concerning a print instruction to print an electronic document, generating identification information for uniquely specifying the electronic document when a document image of the electronic document is printed, generating a code image that includes address information for specifying a position of a surface of a medium to fit to a size of the medium, on which the document image is printed, and the generated identification information, and storing information concerning a correlation between the identification information included in the code image and the electronic document.

BRIEF DESCRIPTION OF THE DRAWINGS

Embodiments of the present invention will be described in detail based on the following figures, wherein:

FIG. 6 is a diagram showing a data structure for managing the correlation between an electronic document, address information, and medium identification information;

DETAILED DESCRIPTION OF THE INVENTION

Embodiments according to the present invention will now be described in detail with reference to the accompanying drawings.

Figure 1:
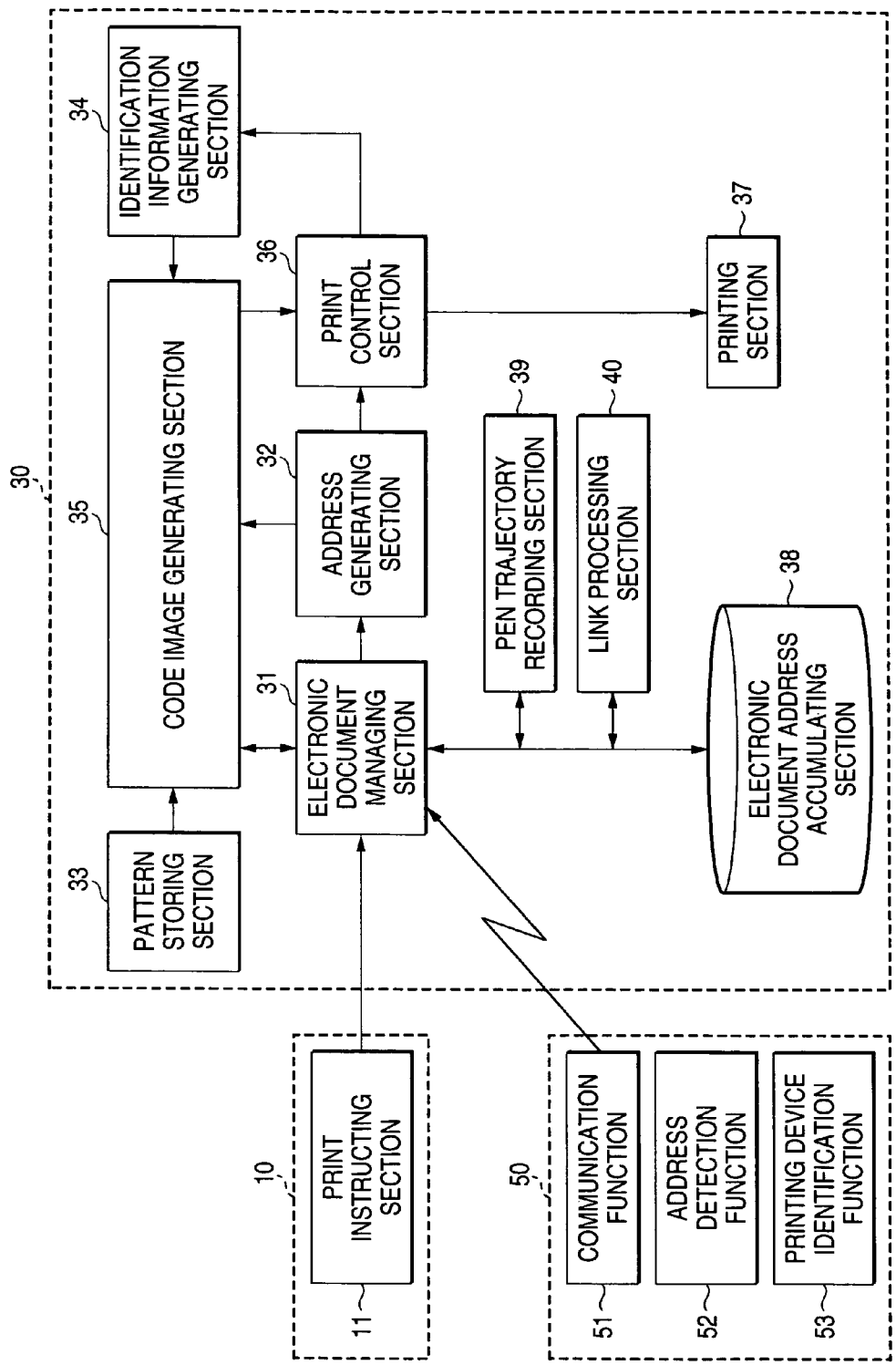
FIG. 1 is a diagram showing the overall configuration of an electronic document management system to which an embodiment of the present invention is applied.

FIG. 1 shows the overall configuration of an electronic document management system according to an embodiment of the present invention. The electronic document management system shown in FIG. 1 includes a personal computer (PC) 10 that instructs to print electronic documents, a printing device 30 that prints the electronic documents on a medium, such as a paper or the like, and a pen-type input device 50 that reads address information concerning the media on which the electronic documents are printed by the printing device 30.

Moreover, the term 'electronic document' is not limited to 'document' or text information but includes images, such as pictures, photos and figures, bitmap images, figure information, or other print information. Also, 'document image' of the electronic document is printed.

The personal computer 10 includes a print instructing section 11 that instructs the printing device 30 to print. The print instructing section 11 instructs to print the electronic documents owned by the personal computer 10 and, for example, also instructs to print documents stored in an external electronic document database (document repository) using URLs (Uniform Resource Locators). When instructing to print the documents, the print instructing section 11 instructs the magnification ratio or Nup. In the Nup information, the number of sheets of the electronic document printed on a medium is specified. Also, the personal computer 10 can be constituted to function as a device, for example, for editing, writing, or storing the electronic documents.

The printing device 30 includes an electronic document managing section 31 that manages the correlation between information for uniquely specifying a medium (medium identifying information) and an electronic document, and an address generating section 32 that generates address information concerning consecutive addresses to be printed on a medium. Also, the printing device 30 includes a pattern storing section 33 that stores patterns used as code images in a memory, and an identification information generating section 34 that generates information (medium identification information) for specifying a medium. Also, the printing device 30 includes a code image generating section 35 that generates code images using patterns read from the pattern storing section 33 based on addresses generated and encoded by the address generating section 32 and medium identification information generated and encoded by the identification information generating section 34. Also, the printing device 30 includes a print control section 36 that performs the print control for printing the inputted electronic document and the generated code image, and a printing section (image forming section) 37 that, for example, prints code images or electronic documents by an electro-photographic method. Also, as described in the following data structure, the printing device 30 includes an electronic document address accumulating section 38 that accumulates the correlation between the electronic document, the address information, and the medium identification information, and a pen trajectory recording section 39 that records a pen trajectory made by a user. Also, the printing device 30 includes a link processing section 40 that performs processes based on link information set on the electronic documents.

The electronic document managing section 31 manages such that the printed electronic document and the medium identification information for uniquely specifying the medium correlate to each other. Also, the electronic document managing section 31 functions as an electronic document acquisition unit that acquires the electronic documents.

The address information generated by the address generating section 32 is position information printed on a surface of the medium to fit to the size of the medium.

The pattern storing section 33 defines, for example, a slant line, such as slash '/' or backslash '\', or a dot pattern as a pattern used in a code image.

For example, a print-out time (print date and time information) can be used as medium identification information generated by the identification information generating section 34. For example, printing counter may be added to the identification information of the printing device.

The code image generating section 35 stores the identification information and address information encoded through the error correction and error detection in a two-dimensional code. Also, the code image generating section 35 arranges the two-dimensional code in which different address information is stored on an image of a printing size in a grid shape using a pattern stored in the pattern storing section 33.

The print control section 36 performs a processing of overlapping the document image generated from the electronic document and the generated code image. At this time, the print control section 36 controls the printing section 37 according to information concerning a margin of a medium to be printed, the size of the printing medium, or the number of copies.

The pen trajectory recording section 39 interprets a moving trajectory of the pen-type input device 50 using the position information included in the code information and records the motion information of the pen-type input device 50. However, as described below, when the pen-type input device 50 has a function of interpreting the moving trajectory, the pen trajectory recording section 39 does not interpret the moving trajectory of the pen-type input device 50, but records the motion information inputted from the pen-type input device 50.

Also, the pen trajectory recording section 39 controls to overlap a corresponding original electronic document and to display on a display device (not shown). Accordingly, it is possible to represent a stroke written on the medium on an electronic document visually on the display device.

When link information is already set on a specified position of an original electronic document, the link processing section 40 has a corresponding table indicating the correlation between the position, URL, and a start program. For example, when a position with a link attached thereto is designated by the pen-type input device 50, the link processing section 40 recognizes by position information interpreted from code information that the link is designated. Next, the link processing section 40 can open a homepage of the designated URL or run programs on a browser based on the corresponding table.

On the other hand, the pen-type input device 50 has a communication function 51 that communicates with external devices, such as the printing device 30, an address detection function 52 that detects addresses having, for example, X and Y coordinates from a two-dimensional code of a printed medium, and a printing device identification function 53 that is included in the two-dimensional code of the medium to identify the printing device, for example, from medium identification information. In the electronic document management system shown in FIG. 1, a direct communication is performed between the pen-type input device 50 and the printing device 30.

The communication function 51 transmits code information concerning a read medium. The communication can be performed by accessing an interface, such as a USB (Universal Serial Bus) or the like, via a cable. In addition, the communication can be performed using a wireless LAN, RS-232C, or Bluetooth.

Figure 2B:
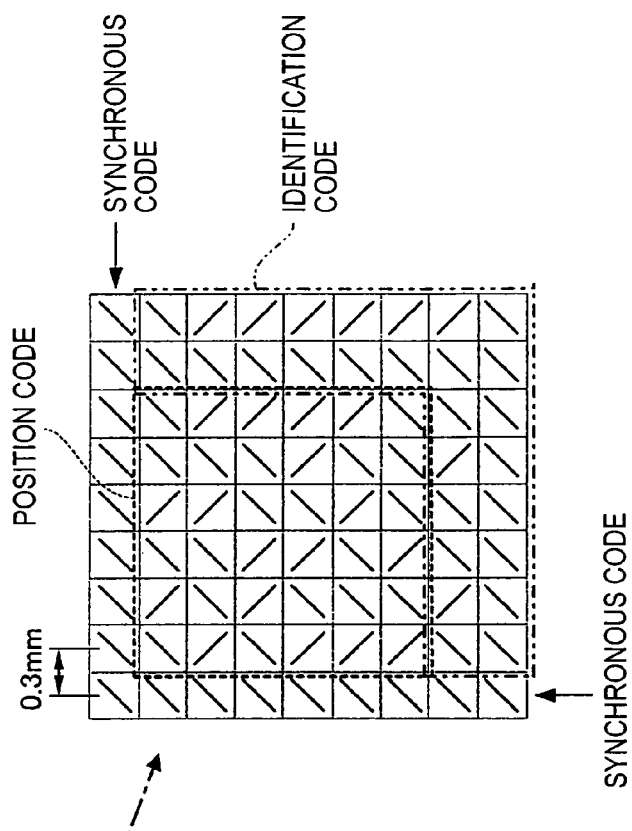
FIGS. 2A to 2C are diagrams illustrating a two-dimensional code image generated by a code image generating section of a printing device and printed by a printing section.
Figure 2A:
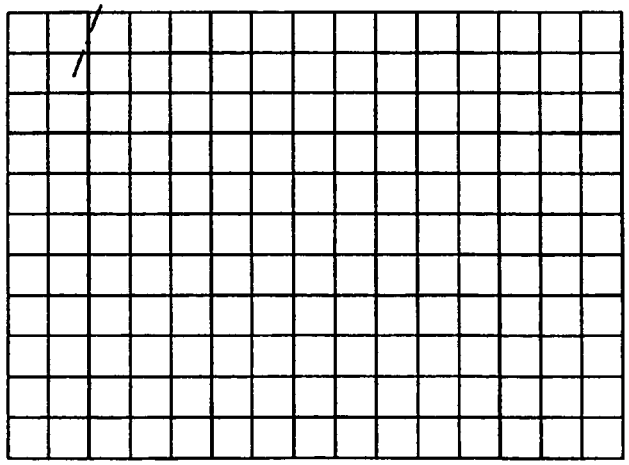
Figure 2C:
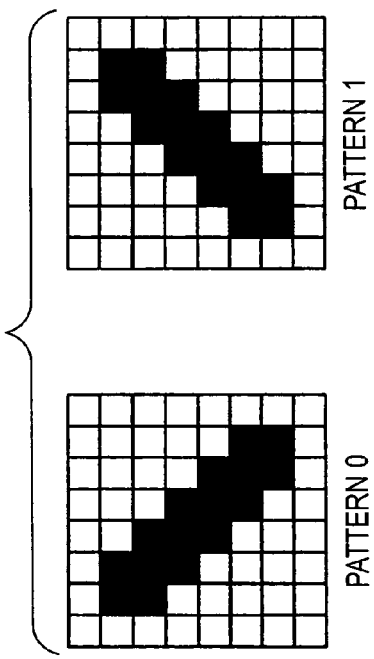

FIGS. 2A to 2c are diagrams illustrating two-dimensional code images which are generated by the code image generating section 35 of the printing device 30 and are printed by the printing section 37. FIG. 2A is a diagram showing a two-dimensional code image in a non-visible image and in a grid shape. FIG. 2B is a diagram showing a single unit of a two-dimensional code image in which a non-visible image is recognized by irradiating infrared light. FIG. 2C is a diagram illustrating a slant line pattern, such as a backslash '\' and a slash '/'. The two-dimensional code image formed by the printing section 37 is formed by a non-visible toner which has a maximum absorption ratio of, for example, 7% or less, in a visible light region (400 to 700 nm), and has an absorption ratio of, for example, at least 30% in a near-infrared region (800 to 1000 nm). Also, the non-visible toner having an average dispersion diameter of 100 to 600 nm is used to improve capability of absorbing the near-infrared light required for mechanical reading of an image. In this case, the term 'visible' and the term 'non-visible' have no relation to whether it can be recognized through the naked eye. The term 'visible' and the term 'non-visible' are distinguished according to whether or not an image formed on a printed medium can be recognized according to a color-forming property due to the absorption of a specified wavelength in a visible light region. Also, a method of forming an image using the non-visible toner is disclosed in JP-A-2003-186238.

The two-dimensional code images shown in FIGS. 2A to 2C are formed in non-visible images. For the non-visible image, a mechanical reading process by infrared light irradiation and a decoding process can be stably performed over a long period, such that high-density information can be recorded. Also, apart from a region in which a visible image is provided on a surface of a medium to which the image is output, the non-visible image can be provided in any region. In the present embodiment, the non-visible image is formed on the entire surface (space) of a medium to fit to the size of the printed medium. Also, for example, it is more preferable that a non-visible image can be recognized by a difference in gloss as viewed with the naked eye. However, the term 'the entire surface' does not imply that four corners of a paper are included. In a device employing an electro-photographic method, since the circumference of a surface cannot be usually printed, it is not necessary to print the non-visible image in such a range.

A two-dimensional code pattern shown in FIG. 2B includes a region for storing a position code (a code corresponding to address information) and a region for storing an identification code (a code corresponding to identification information) for uniquely specifying a printing medium. Also, it includes a region for storing a synchronous code. As shown in FIG. 2A, the plural two-dimensional code patterns are arranged, and two-dimensional codes in which different address information is stored on the entire surface of a medium to fit to the size of the printed medium are arranged in a grid shape. That is, on a surface of the medium, there are provided plural code patterns, for example, the two-dimensional code pattern as shown in FIG. 2B, each of which has an identification code, a position code, and a synchronous code. The different position information is stored in plural regions for the position code according to the position. On the other hand, the same identification information is stored in plural regions for the identification code. The position code is arranged in a rectangular region of 6 bits×6 bits.

Each bit value is formed by plural minute line bitmaps which are different in rotation angle from each other, and bit values 0 and 1 are represented by the slant line patterns (patterns 0 and 1) shown in FIG. 2C. More specifically, bit 0 and bit 1 are represented using the slash '/' and backslash '\' which are different in gradient from each other. For example, the slash '/' represents bit 0 while the backslash '\' represents bit 1. The slant line pattern consists of 8×8 pixels with 600 dpi. A left-upward slant line pattern (pattern 0) denotes a bit value 0, and a right-upward slant line pattern (pattern 1) denotes a bit value 1. Accordingly, information of 1 bit (0 or 1) can be represented with a single slant line pattern. With the minute line bitmap consisting of the two kinds of gradients, it is possible to provide a two-dimensional code pattern. With the two-dimensional code pattern, noise affecting on a visible image is extremely small, and a large amount of information can be embedded with high density.

Also, while the slant line patterns are 90° different in angle from each other in FIG. 2C, four slant line patterns each having an angle difference of 45° can be formed. In this case, information of 2 bits (0 to 3) can be represented with a single slant line pattern. That is, it is possible to increase the number of represented bits by increasing the kinds of angles of the slant line pattern.

While the bit value is encoded using the slant line pattern in FIG. 2C, the pattern is not limited to the slant line pattern. ON/OFF of a dot may be used as an example of an encoding method. There is another encoding method of using a direction in which a position of a dot is deviated from a reference position.

In the position code region shown in FIG. 2B, position information having a total of 36 bits is stored. Eighteen bits of the 36 bits can be used for encoding of X coordinates and the remaining eighteen bits can be used for encoding of Y coordinates. If the respective 18 bits are used for encoding of positions, 2^18 (about 260,000) positions can be encoded. If each slant line pattern consists of 8 pixels×8 pixels (600dpi), as shown in FIG. 2C, the size of the two-dimensional code (including the synchronous code) of FIG. 2B is equal to about 3 mm×3 mm (8 pixels×9 bits×0.0423 mm), since 1 dot of 600 dpi is equal to 0.0423 mm. If 260,000 positions with intervals of 3 mm are encoded, the length of about 786 m can be encoded. When eighteen bits are used for encoding of positions and a detection error of a slant line pattern occurs, a redundancy bit may be included for error detection or error correction.

The identification code is provided in a rectangular region of 2 bits×8 bits and 2 bits×6 bits, which can store identification information of a total of 28 bits. If 28 bits are used for the identification information, about 270,000,000 (2^28) identification information can be represented. The identification code can also include a redundancy bit for error detection or error correction among 28 bits.

Figure 3:
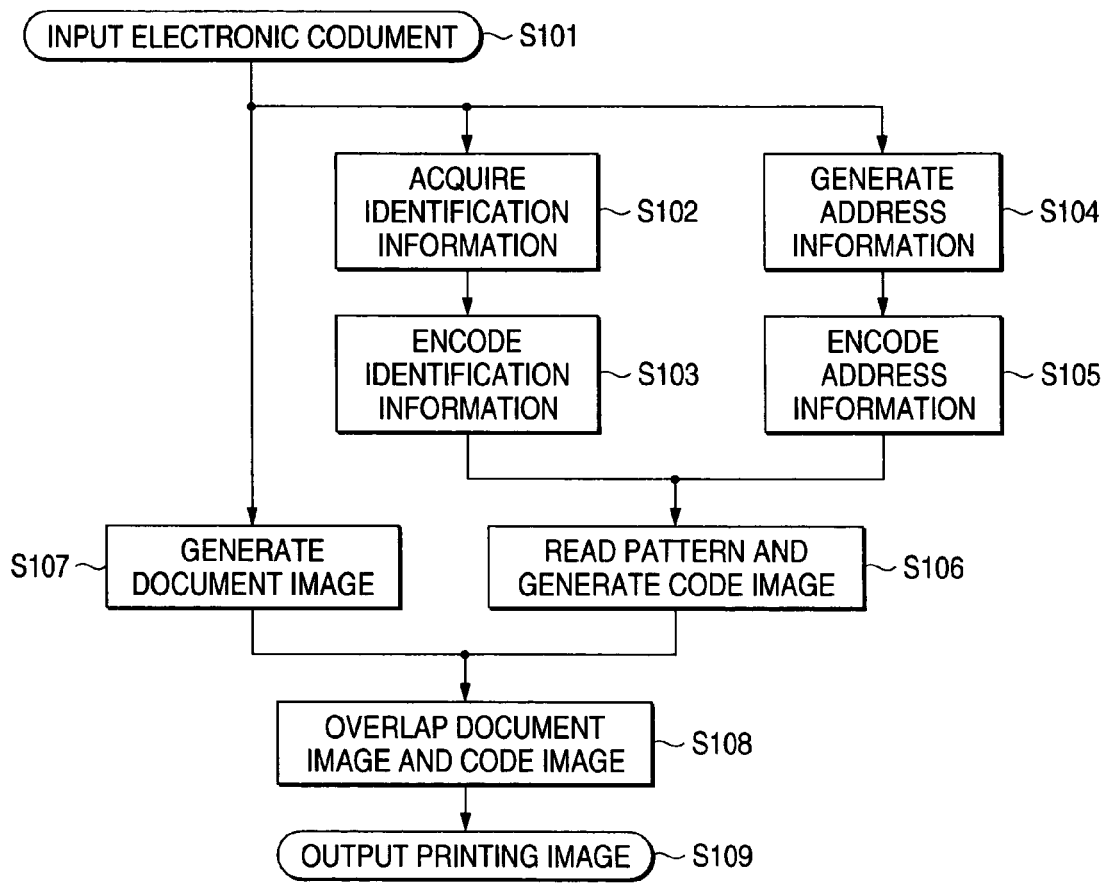
FIG. 3 is a flow chart showing a process of embedding an address which is executed by the printing device shown in FIG. 1.

FIG. 3 is a flow chart showing an address embedding process executed by the printing device 30 shown in FIG. 1. The electronic document managing section 31 of the printing device 30 inputs electronic documents based on instructions from the print instructing section 11 of the personal computer 10 (Step S101). The inputted electronic documents maybe acquired, for example, from a repository connected to a network using the URL. Also, the electronic document may be accumulated in an electronic document accumulating section (not shown) of the printing device 30, or may be received directly from the personal computer 10 whenever printing is performed.

The code image generating section 35 having obtained input information of electronic document from the electronic document managing section 31 acquires medium identification information generated by the identification information generating section 34 (Step S102). Next, the code image generating section 35 encodes the obtained medium identification information (Step S103). On the other hand, the address generating section 32 having obtained the input information of the electronic document from the electronic document managing section 31 generates address information (position information) on consecutive addresses to be printed on the surface of the medium to fit to the size of the printed medium (Step S104). The address generating section 32 encodes the generated address information (Step S105). In the step S104, addresses are generated to fit to the size of the medium to be printed, for example, A4-sized, A3-sized, B5-sized, B4-sized document, or the like. Also, in order to enlarge or reduce the size of the inputted electronic document, the address corresponding to the medium is changed. At this time, for example, when an A4-sized electronic document is reduced to an A5-sized electronic document and then is output on an A4-sized medium, the remaining part becomes a margin. The margin may be assigned with consecutive addresses. Alternatively, the remaining part may remain a margin without forming an image using a non-visible toner. Also, in the step S105 performed by the address generating section 32, for example, encoding can be performed using the RS (Reed Solomon) code or BCH code, which are well-known error correction techniques. Also, a CRC (Cyclic Redundancy Check) or checksum value of position information is calculated as an error detection code, which may be added to the position information as a redundancy bit. Also, encoding of the identification information performed by the identification information generating section 34 and encoding of the address information (position information) performed by the address generating section 32 may be performed using the same encoding method.

Subsequently, the code image generating section 35 reads patterns from the pattern storing section 33 and, at the same time, generates code images using encoded medium identification information and encoded address information (position information), which are arranged in two dimensions (Step S106). That is, the encoded address information (encoded position information) and the encoded identification information, which are arranged in two dimensions, are synthesized, thereby generating a two-dimensional code array corresponding to an output image size. At this time, the encoded address information uses codes obtained by encoding different address information according to the arranged position. The encoded identification information uses codes obtained by encoding the same identification information, regardless of the position.

On the other hand, the print control section 36 images the electronic document to generate a document image (Step S107). For example, when images are expanded in a surface memory, input color signals of R (red), G (green), and B (blue) are converted into printed color signals of Y (yellow), M (magenta), C (cyan), and K (black). The print control section 36 overlaps the code image generated in the step S106 and the document image generated in the step S107 (Step S108), and outputs print images to the printing section 37 (Step S109). The print control section 36 and the printing section 37 form the code image using a color agent, which cannot be easily identified (almost non-visible) with the naked eye, and form the document image using a color agent, which can be identified (visible) with the naked eye. The non-visible color agent has the characteristic that absorbs a specific infrared wavelength rather than a visible light wavelength. The visible color agent has the characteristic that absorbs visible light wavelength more. The present embodiment has disclosed an example of using a non-visible color agent but is not limited thereto. For example, the code image maybe formed using carbon black which absorbs an infrared wavelength, and the document image may be formed using color agents of yellow, magenta, and cyan (which absorb the infrared wavelength less).

Figure 4:
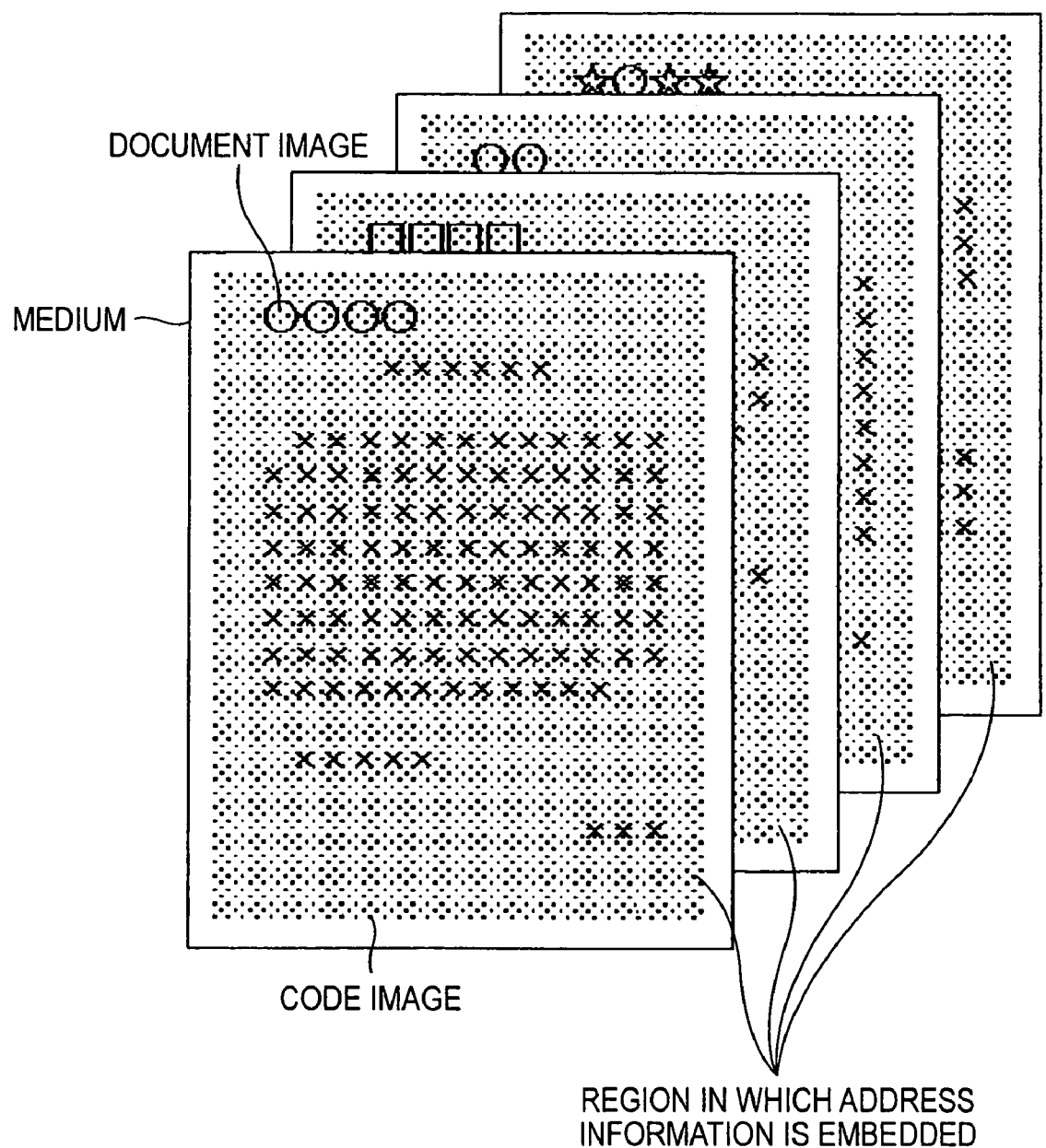
FIG. 4 is a diagram showing an example of a printing image including a code image.

FIG. 4 is a diagram showing an example of a printing image including the code image obtained in such a manner. As shown in FIG. 4, a code image is printed by a non-visible toner on a surface of a medium (image output medium), and a document image formed by a visible toner overlap thereon. A region in which address information is embedded is formed by the code image. As described above, the address information is distributed on a surface of the medium to fit to the size of the printed medium. The code image representing the address information is formed on the entire surface of the medium. Also, in the present embodiment, the medium identification information contained in the code image is different for each medium. Accordingly, although the electronic documents are the same, different identification information is added according to surfaces and the number of copies when plural surfaces or plural copies are printed. That is, although the same electronic document is printed, contents of the code images are different from one another for each medium. On the other hand, the address information (position information) included in the code image may be the same in each job, each surface, and each medium. In the present embodiment, the identification information included in the code image includes information for uniquely specifying the medium. Accordingly, for example, it is not necessary to assign a finite address like the Anoto functionality provided by Anoto AB. Also, since it is not necessary to assign the finite address, it is possible to significantly reduce various processes within a system in connection with the address assignment.

When a photo image is included in the printed electronic document, if the photo image needs not to be contaminated, a process of printing a non-visible image using a non-visible toner cannot be performed on a region in which the photo image is recognized to be formed. It is preferable that a user can select whether or not to perform such a process by providing a user interface to allow the user to make a selection. Also, in order to recognize a photo image part from an electronic document, a text/image separation (T/I separation) technique which is performed in a related art image process may be used. Here, a detailed description thereof will be omitted. In addition, it is possible to cause the information for specifying the electronic document to be included in the code image. As the information for specifying the electronic document, an identification number (ID) of the electronic document is widely used. Also, the information for uniquely specifying the medium may be collectively managed by an external server and may be acquired via a network at the time of printing.

The description of the detailed configuration of the printing section (image forming section) 37 will now be given.

Figure 5:
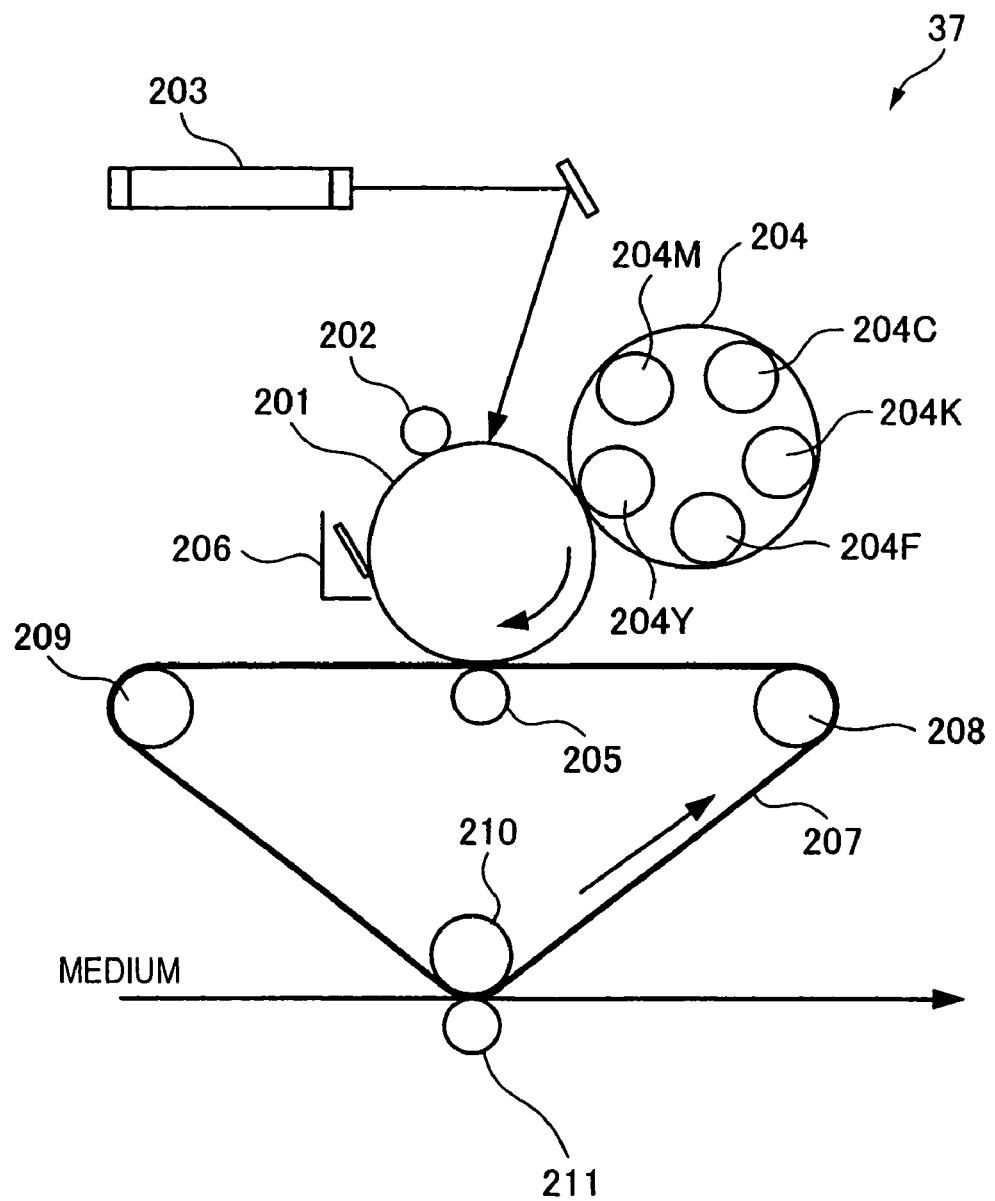
FIG. 5 is a diagram showing the configuration of a printing section (image forming section), which forms a visible image and a non-visible image simultaneously, according to the embodiment of the present invention.

FIG. 5 is a schematic diagram showing the configuration of the printing section (image forming section) 37 that forms visible images and non-visible images simultaneously according to the present embodiment. The printing section 37 shown in FIG. 5 includes an image carrier 201, an electrifier 202, an exposing device 203, a rotary developing device 204, a primary transfer roll 205, a cleaning device 206, an intermediate transfer belt 207, support rolls 208 and 209 of the intermediate transfer belt 207, an opposite roll 210 provided in a secondary transfer section, and a secondary transfer roll 211.

The image carrier 201 is a photosensitive drum having a photosensitive layer on its circumferential surface. The image carrier 201 is provided to be rotatable in a direction of the arrow shown in FIG. 5. The electrifier 202 electrifies a surface of the image carrier 201 uniformly. The exposing device 203 irradiates, for example, a laser beam onto the surface of the image carrier 201 uniformly electrified by the electrifier 202 to form an electrostatic latent image. The rotary developing device 204 includes five developers 204F, 204Y, 204M, 204C, and 204K for receiving a non-visible toner, a yellow toner, a magenta toner, a cyan toner, and a black toner, respectively. In the printing section shown in FIG. 5, since the toners are used as developing agents for forming images, the developers 204F, 204Y, 204M, 204C, and 204K receive the non-visible toner, the yellow toner, the magenta toner, the cyan toner, and the black toner, respectively. The rotary developing device 204 rotates so that the five developers 204F, 204Y, 204M, 204C, and 204K can sequentially approach and face the image carrier 201 to transfer the toners to electrostatic latent images corresponding to each color, thereby forming visible toner images and non-visible toner images.

The primary transfer roll 205 primarily transfers toner images (visible toner images or non-visible toner images) formed on the surface of the image carrier 201 to the outer circumferential surface of the intermediate transfer belt 207 while the intermediate transfer belt 207 is interposed between the primary transfer roll 205 and the image carrier 201. The cleaning device 206 removes toners remaining on the surface of the image carrier 201 after the primary transfer is performed. The intermediate transfer belt 207 is supported by plural support rolls 208 and 209 and an opposite roll 210 so as to rotate in a direction of the arrow shown in FIG. 5. The secondary transfer roll 211 secondarily transfers the toner images transferred on the outer circumferential surface of the intermediate transfer belt 207 onto a medium (paper) transported in a direction of the arrow by a paper transport unit (not shown).

In the printing section 37 constituted in such a manner, the toner images are formed on the surface of the image carrier 201, and then the toner images are transferred to the outer circumferential surface of the intermediate transfer belt 207 in multiple. That is, after the image carrier 201 rotates and the surface of the image carrier 201 is uniformly electrified by the electrifier 202, image light is irradiated by the exposing device 203 onto the image carrier 201 to form an electrostatic latent image. In a process of forming the electrostatic latent image, a non-visible toner image is first formed. That is, after it is developed by the non-visible developer 204F, the toner image is transferred to the outer circumferential surface of the intermediate transfer belt 207 by the primary transfer roll 205. At this time, the non-visible toner which is not transferred to the intermediate transfer belt 207 and remains on the surface of the image carrier 201 is removed by the cleaning device 206. Then, the intermediate transfer belt 207 with the non-visible toner image formed on the outer circumferential thereof is located on a position at which the subsequent yellow toner image is to be stacked and transferred on the non-visible toner image while maintaining the non-visible toner image on the outer circumferential surface of the intermediate transfer belt 207. Subsequently, with respect to magenta, cyan, and black toner images, the electrification process by the electrifier 202, the process of irradiating image light by the exposing device 203, the process of forming toner images by the respective developers 204M, 204C, 204K, and the process of transferring the toner image on the outer circumferential surface of the intermediate transfer belt 207 are sequentially repeated.

As a result, the non-visible toner image and the full-color toner image (visible toner image) constituting four colors of toner images are carried on the outer circumferential surface of the intermediate transfer belt 207. The full-color visible toner image and the non-visible toner image are collectively transferred to a medium (paper) by the secondary transfer roll 211. Accordingly, on a surface on which an image is formed, a recorded image in which the full-color visible image and the non-visible image are mixed can be obtained. As a result of the sequence in the primary transfer process, the non-visible image is formed on the top layer of the medium. Accordingly, since the non-visible image in which a code image shown in FIGS. 2A to 2C is printed is formed on an upper surface of the visible image on which the document image is printed, reading of the non-visible image is not disturbed by the visible image. Also, instead of the full-color visible image, the visible image may be made of, for example, a monochrome color or a plus one color in which another color is added. As a result, the visible image and the non-visible image are simultaneously formed.

A data structure accumulated in the electronic document address accumulating section 38 of FIG. 1 will now be described.

FIG. 6 is a diagram showing an example of a data structure for managing the correlation among the electronic document, address information, and medium identification information. FIG. 6 shows an example of a content accumulated in the electronic document address accumulating section 38. The data structure shown in FIG. 6 has a management ID, an electronic document name, page information, a used address (start), a used address (last), print-out time, an electronic document size, a paper size, a magnification ratio (%), Nup information. The management IDs 1 to 6 show six printed pages of an electronic document having the same image. Therefore, the management IDs 1 to 6 have the same URL in the electronic document name, and have the page information indicated by 1 to 6. Also, the management IDs 7 and 8 have two consecutively printed pages of the electronic document having the same image, and have the page information indicated by 1 and 2. Similarly, the management IDs 9 and 10 have two consecutively printed pages of the electronic document having the same image, and have the page information indicated by 1 and 2.

The present embodiment has a feature that the used addresses are assigned according to the size of the paper to be outputted. In FIG. 6, one A4-sized paper is assigned 60900 addresses, and one A3-sized paper is assigned 121800 addresses (see the management ID 8). The used addresses are reset for each electronic document. Therefore, in the example shown in FIG. 6, after six A4-sized papers (365400 addresses) are assigned over the management IDs 1 to 6, the management ID 7 for printing the document image of a next electronic document is reset and the used address is initiated from the first. Similarly, after 182700 addresses corresponding to the sum of one A4-sized paper and one A3-sized paper are assigned over the management IDs 7 and 8, the management ID 9 for printing the document image of a next electronic document is reset and the used address is initiated from the first. In this case, the management IDs 9 and 10 have the Nup information '2', and thus two electronic documents are printed on one paper. Consequently, the A3-sized electronic document is printed on the A4-sized paper, which results in the magnification ratio of 70%. In this case, while the sizes of the electronic documents are equal to each other, for example, A3-sized documents, one printed paper is assigned with 60900 addresses to fit to the size of the printed paper.

Although address assignment is constituted to be reset in units of electronic document, the address assignment may be constituted to be reset in units of printing job. That is, in units of job, the same job is assigned with consecutive addresses, even when the pages of the electronic document are changed. In addition, addresses can be assigned without resetting.

In addition, for example, when an A4-sized electronic document is reduced in size to 70%, there is a blank space, for example, a portion as much as a half page, in which there does not exist the electronic document. Similarly, if an electronic document constituting plural odd pages is printed, for example, with the 2up, a blank space as much as a half page is created in the last page. First, the blank space is not assigned with addresses, and the code image using the non-visible toner is not formed. However, since a user may write characters by hand in the blank space, it is preferable that the blank space is assigned with addresses and the code image is formed using the non-visible toner in the blank space.

Also, in FIG. 6, the print-out time is used as information for specifying the medium. The print-out time is specified for each medium in the printing device 30, such that the medium can be uniquely specified. Since the print-out time is included as identification information in the code image, for example, the medium ID, which is individually assigned from a predetermined management server, does not need to be used. Also, the medium specification information is completely different from the ID of the electronic document. For example, when plural copies of the same electronic document are printed, or plural pages of the electronic document are printed in one medium using Nup, it is not possible to match the pages of the electronic document with the medium using the electronic document ID. In the present embodiment, it is possible to identify in units of printed medium and to manage the electronic document in units of medium by causing and printing the medium specification information to be included in the code image, such that a markedly outstanding management system over the related art can be provided. Also, if the medium specification information is set by combining the print-out time with the device ID for identifying the printing device 30, the property as the medium specification information is infinite. Therefore, according to the present embodiment, for example, without previously assigning a finite address space, which is provided by Anoto AB, it is possible to form a substantially infinite range of addresses whenever printing is performed.

Also, as the medium specification information, there may be used a combination of the device ID for identifying the printing device 30 and information concerning the count number of papers counted by a counter (not shown) of the printing device 30 whenever the papers are printed. When the combination of the device ID and the count number is used, the print-out time does not need to be managed and the amount of information required for the code image can be reduced. Also, information (for example, user ID) on the user having issued the print instruction, information concerning the name of an organization in which printing is performed, and information concerning the position at which printing is performed may be selected as the medium specification information. For example, the information concerning the user or the organization can be recognized by reading a card if a device is used in which printing can be made by inserting the card. Also, if the personal computer 10 shown in FIG. 1 issues the print instruction, identification information can be identified by information belonging to the personal computer 10.

The pen-type input device 50 will now be described.

Figure 7:
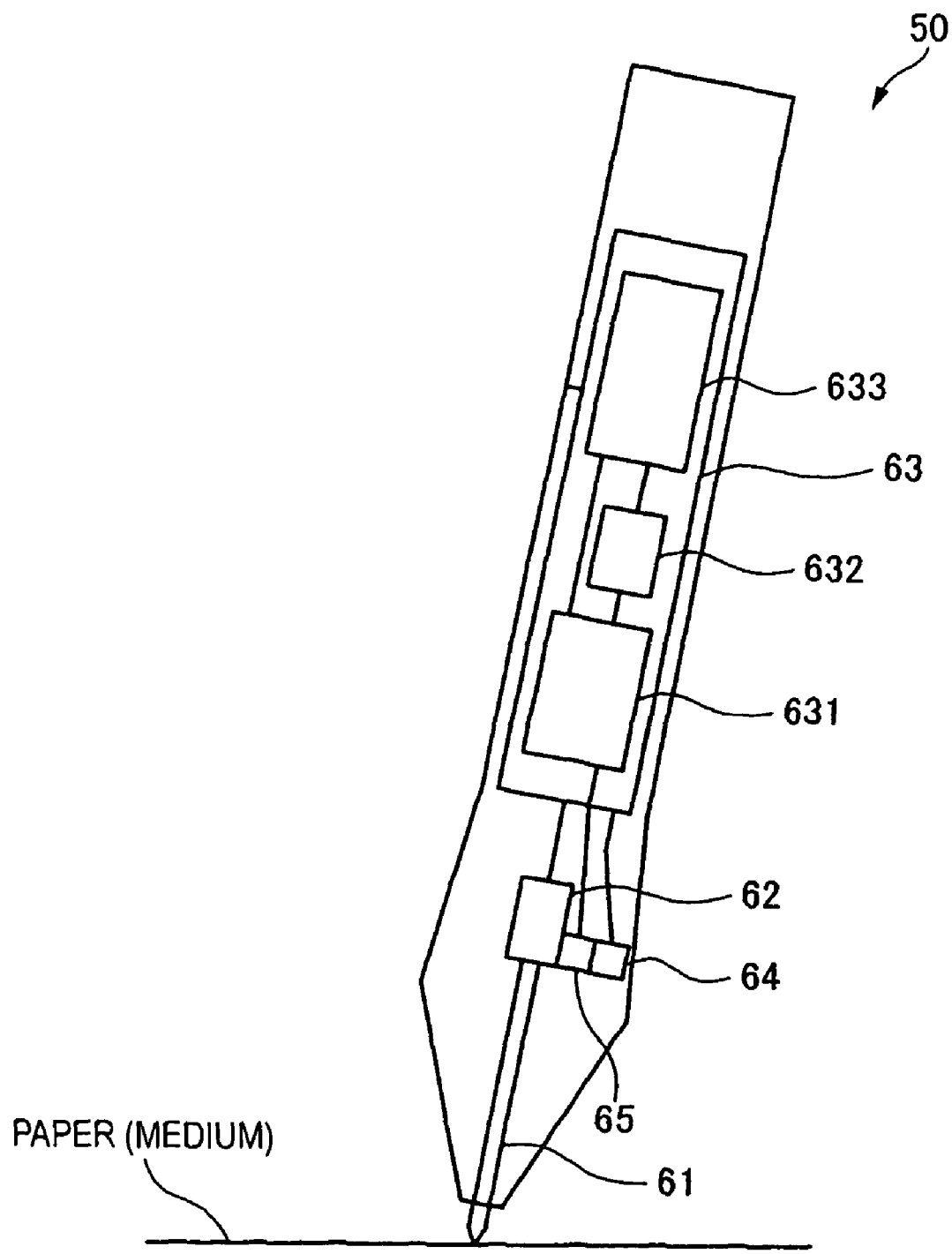
FIG. 7 is a diagram showing the configuration of a pen-type input device.

FIG. 7 shows the configuration of the pen-type input device 50. Although the pen-type input device 50 has been primarily described about the function for communication with the printing device 30 in FIG. 1, the overall configuration of the pen-type input device 50 is shown in FIG. 7 including the function of reading the non-visible image. The pen-type input device 50 includes a writing section 61, such as a pen, that writes characters or figures on the medium (paper), on which the combination of the code image and the document image is printed, and a writing-pressure detecting section 62 that monitors the motion of the writing section 61 and detects the pressure of the pen-type input device 50 applied on the paper. Also, the pen-type input device 50 includes a control section 63 that controls the entire operation of the pen-type input device 50, an infrared irradiating section 64 that irradiates infrared light in order to read the code image on the paper, and an image input section 65 that complements and inputs the code image onto which infrared light is irradiated.

The control section 63 will now be described in detail.

The control section 63 includes a code acquiring section 631, a trajectory calculating section 632, and an information storing section 633. The code acquiring section 631 interprets an image inputted from the image input section 65 and acquires a code. The trajectory calculating section 632 calculates a trajectory of the front of the pen by correcting a mismatch between the coordinate of the pen front of the writing section 61 and the coordinate of an image complemented by the image input section 65 with respect to the code acquired by the code acquiring section 631. The information storing section 633 stores the code acquired by the code acquiring section 631 or the trajectory information calculated by the trajectory calculating section 632.

Figure 8:
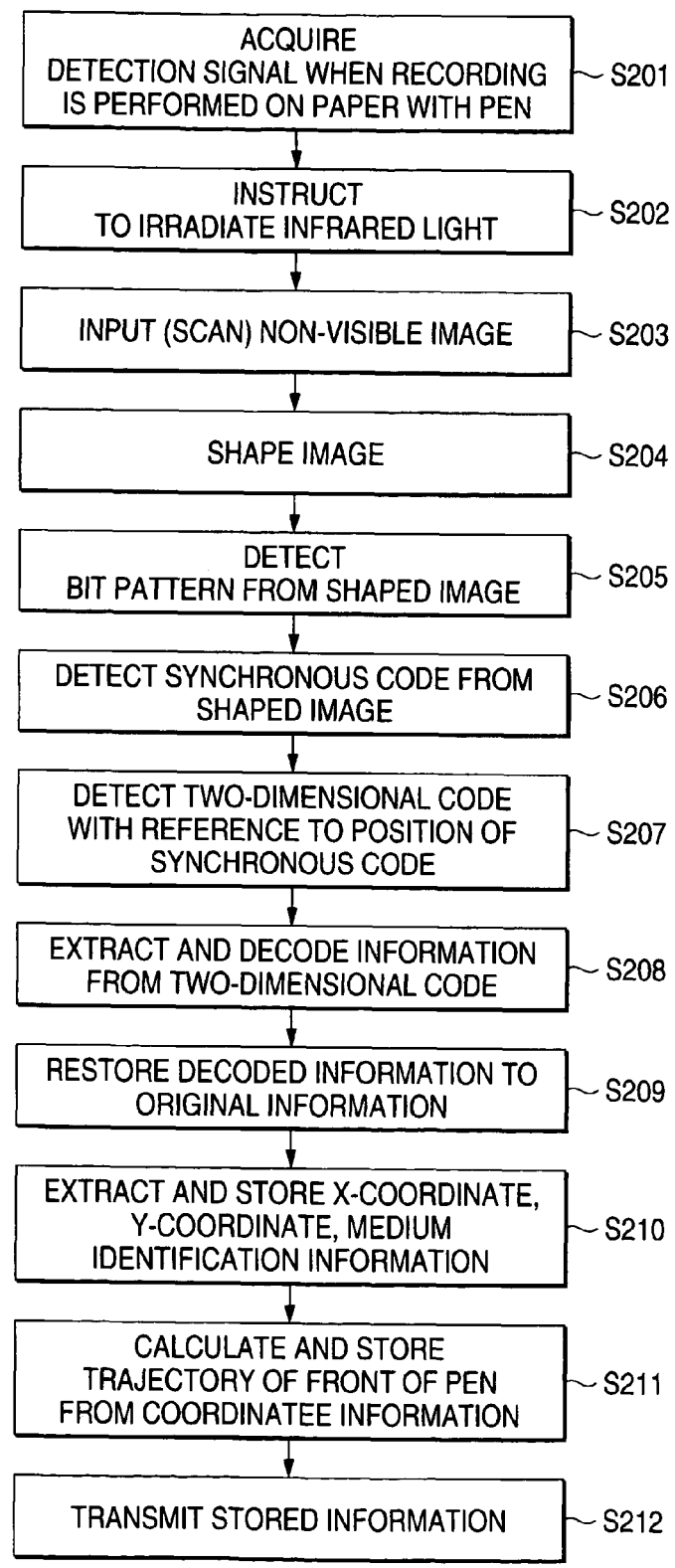
FIG. 8 is a flow chart showing a process, which is primarily executed by a control section of a pen-type input device.

FIG. 8 is a flow chart showing a process, which is executed primarily in the control section 63 of the pen-type input device 50. In the pen-type input device 50, for example, when characters or figures are recorded on the paper, the control section 63 acquires a detection signal, indicating that recording is performed on the paper with the pen, from the writing-pressure detecting section 62 (Step S201). Upon detecting the detection signal, the control section 63 instructs the infrared irradiating section 64 to irradiate infrared light onto the paper (Step S202). Infrared light irradiated onto the paper by the infrared irradiating section 64 is absorbed by the non-visible image. The image input section 65 complements the code image onto which infrared light is irradiated. The control section 63 inputs (scans) the non-visible image through the image input section 65 (Step S203).

Subsequently, the code acquiring section 631 of the control section 63 performs a process of detecting the code image represented in the steps S204 to S210. First, the inputted scan image is shaped (Step S204). Shaping of the scan image implies gradient correction or noise removal. A bit pattern (a slant line pattern), such as slash '/' or backslash '\', is detected from the shaped scan image (Step S205). In addition, a synchronous code, which is a code for determining a position of the two-dimensional code, is detected from the shaped scan image (Step S206). The code acquiring section 631 detects the two-dimensional code with reference to the position of the synchronous code (Step S207). Also, information, such as ECC (Error Correcting Code) or the like, is extracted from the two-dimensional code and then is decoded (Step S208). The decoded information is restored to original information (Step S209).

Figure 9:
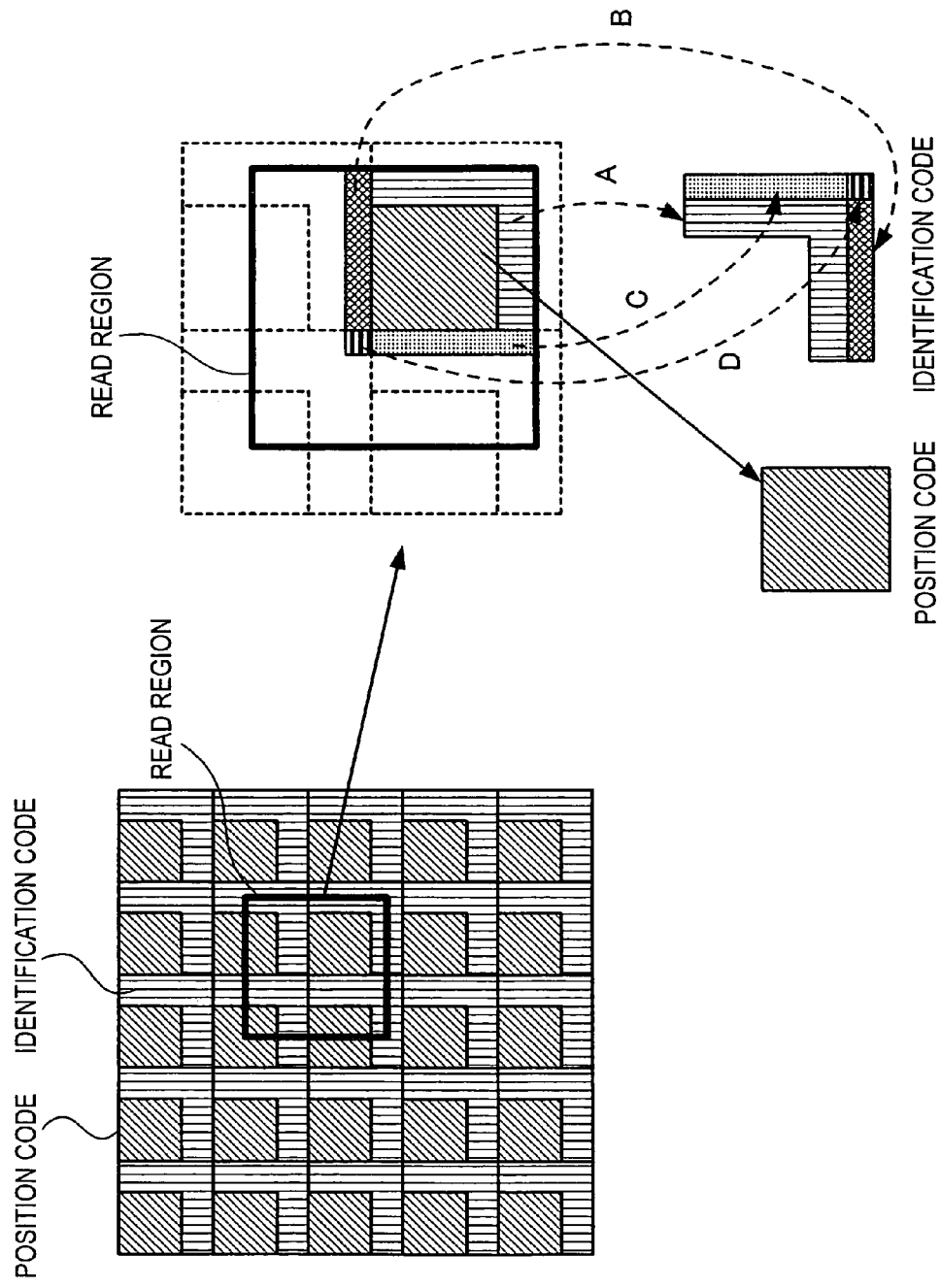
FIGS. 9A and 9B are diagrams illustrating reading of code information in a pen-type input device.

FIGS. 9A and 9B are diagrams illustrating a method of reading code information in the pen-type input device 50. As shown in FIG. 9A, on a printed medium, plural position codes (which correspond to address information) and plural identification codes (which correspond to identification information) are two-dimensionally arranged. In FIG. 9A, synchronous codes are not shown for convenience of explanation. As described above, the plural position codes store different position information according to the arrangement positions, and the plural identification codes store the same identification information, regardless of the arrangement positions. A region for reading the non-visible image read by the image input section 65 is indicated by the thick line of FIG. 9A. FIG. 9B shows around the read region in a magnified scale. The position codes store different information from each other according to the positions within the image. Accordingly, it is not possible to detect if at least one position code is not included in the read image. However, since the identification codes store the same identification information, regardless of the positions within the image, it is possible to restore the identification code from fragmentary information. In FIG. 9B, an identification code is restored by combining four codes (A, B, C, and D) in part in the read region.

The code acquiring section 631 of the control section 63 reads an X-coordinate, a Y-coordinate, and medium identification information from the code information restored in such a manner, and stores them in the information storing section 633 (Step S210). On the other hand, the trajectory calculating section 632 calculates the trajectory of the front of the pen from the coordinate information stored in the information storing section 633, and stores the trajectory in the information storing section 633 (Step S211). The identification information, the address information, or trajectory information stored in the information storing section 633 is transmitted to an external device via the communication function shown in FIG. 1 in wired or wireless manner (Step S212).

The stored information transmitted from the pen-type input device 50 is processed by the electronic document managing section 31 of the printing device 30. For example, writing information by the pen-type input device 50 is added to electronic information specified by the medium specification information, such that synthesized information of the writing information and the electronic information is displayed on the display device (not shown). Also, the writing information may be stored as corrected information of the original electronic document stored in the repository. Also, when writing is performed again after writing is first performed, the corrected information may be also read in addition to the original electronic document, such that new writing information can be added to the electronic document including the corrected information.

Next, the system configuration different from that shown in FIG. 1 will now be described.

Figure 10:
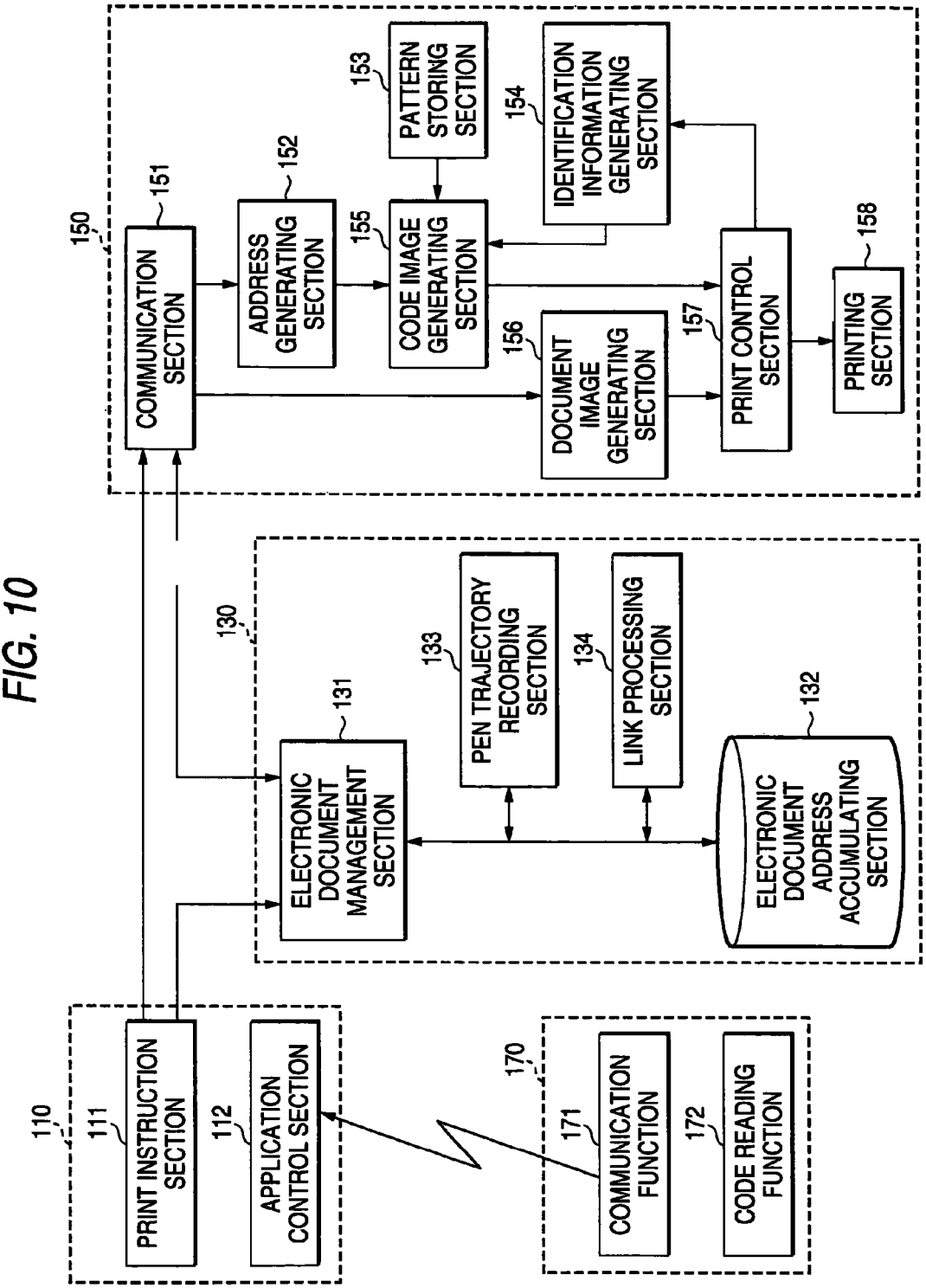
FIG. 10 is a diagram showing another configuration of an electronic document management system.

FIG. 10 shows another configuration of an electronic document management system. The electronic document management system shown in FIG. 10 has a feature that an electronic document management device 130 and a printing device 150 are separated from each other. The system shown in FIG. 10 includes a personal computer 110, an electronic document management device 130, a printing device 150, and a pen-type input device 170.

The personal computer 110 includes a print instructing section 111 which has the same function as the print instructing section 11 of the personal computer 10 shown in FIG. 1. Also, the personal computer 110 shown in FIG. 10 includes an application control section 112. The application control section 112 opens documents in an existing application and operates the application using the pen-type input device 170, for example, application sharing in an electronic conference system. More specifically, when the pen is designated by the pen-type input device 170, the application is operated by transmitting to the application the same event as that when a position is designated using a mouse and clicking the mouse. For example, when tapping on a specified position on a medium with the pen-type input device 170, the same event as that when the left button of the mouse is clicked with respect to the position of the application corresponding to the position on the medium is transmitted.

Also, although the print instruction and the application are performed in the same personal computer 110 in the example of FIG. 10, they may be performed in different personal computers.

The pen-type input device 170 includes a communication function 171 that communicates with an external device, which is similar to the communication function 51 of the pen-type input device 50 shown in FIG. 1. However, the communication function 171 communicates with the application control section 112 of the personal computer 110 in the example shown in FIG. 10, while the communication function 51 communicates with the printing device 30 in the example shown in FIG. 1. Also, the pen-type input device 170 shown in FIG. 10 includes a code reading function 172 which reads and interprets code information. Moreover, the detailed configuration of the pen-type input device 170 maybe the same as that of the pen-type input device 50 shown in FIG. 7.

The electronic document management device 130 includes an electronic document managing section 131 that manages the correlation between generated addresses and electronic documents, and an electronic document address accumulating section 132 that accumulates a data structure, as shown in FIG. 6, for example, the correlation among electronic documents, address information, and medium identification information. Also, the electronic document management device 130 includes a pen trajectory recording section 133 that records a pen trajectory made by a user, and a link processing section 134 that performs a process about link information set in the electronic documents. The electronic document management device 130 having such functions may be provided in a server different from or equal to a server for a repository connected to a network in order to provide electronic documents. Also, in the example shown in FIG. 10, the electronic document management device 130 is provided separately from the printing device 150, unlike the example shown in FIG. 1.

The printing device 150 includes a communicating section 151 that receives a print instruction from the print instructing section 111 and, at the same time, acquires electronic documents from the repository via the network. When the communicating section 151 acquires the electronic documents, for example, it is possible to use a URL included in the print instruction. The communicating section 151 also outputs the correlation information among electronic documents, addresses printed on a medium, and medium identification information to the electronic document management device 130 after printing.

Also, the printing device 150 includes an address generating section 152, a pattern storing section 153, an identification information generating section 154, and a code image generating section 155, like the printing device 30 shown in FIG. 1. The address generating section 152 generates address information concerning consecutive addresses to be printed on the medium. The pattern storing section 153 stores patterns used as code images in a memory. The identification information generating section 154 generates information (medium identification information) for uniquely specifying the medium. The code image generating section 155 generates code images using patterns read from the pattern storing section 153 on the basis of addresses generated and encoded by the address generating section 152, and medium identification information generated and encoded by the identification information generating section 154.

Also, the printing device 150 includes a document image generating section 156 that generates a document image from an electronic document acquired through the communicating section 151, a print control section 157 that controls printing, and a printing section 158 that forms images on a medium, for example, using the configuration shown in FIG. 5. The print control section 157 overlaps the document image generated by the document image generating section 156 and the code image generated by the code image generating section 155 to output image data to the printing section 158.

In the electronic document management system shown in FIG. 10, a print image including a code image is formed using the above-described configuration as shown in FIG. 4. When writing or designating is performed using the same pen-type input device 170 as the pen-type input device 50 shown in FIG. 7 on the surface of the paper (medium), on which the print image is formed, the information is transmitted to the electronic document management device 130 through the application control section 112 of the personal computer 110. The electronic document management device 130 records the trajectory of the pen-type input device 170 or processes the link designation by the pen-type input device 170 using the content read from the electronic document address accumulating section 132.

Finally, the system configuration including the repository that stores the electronic documents will be described.

Figure 11:
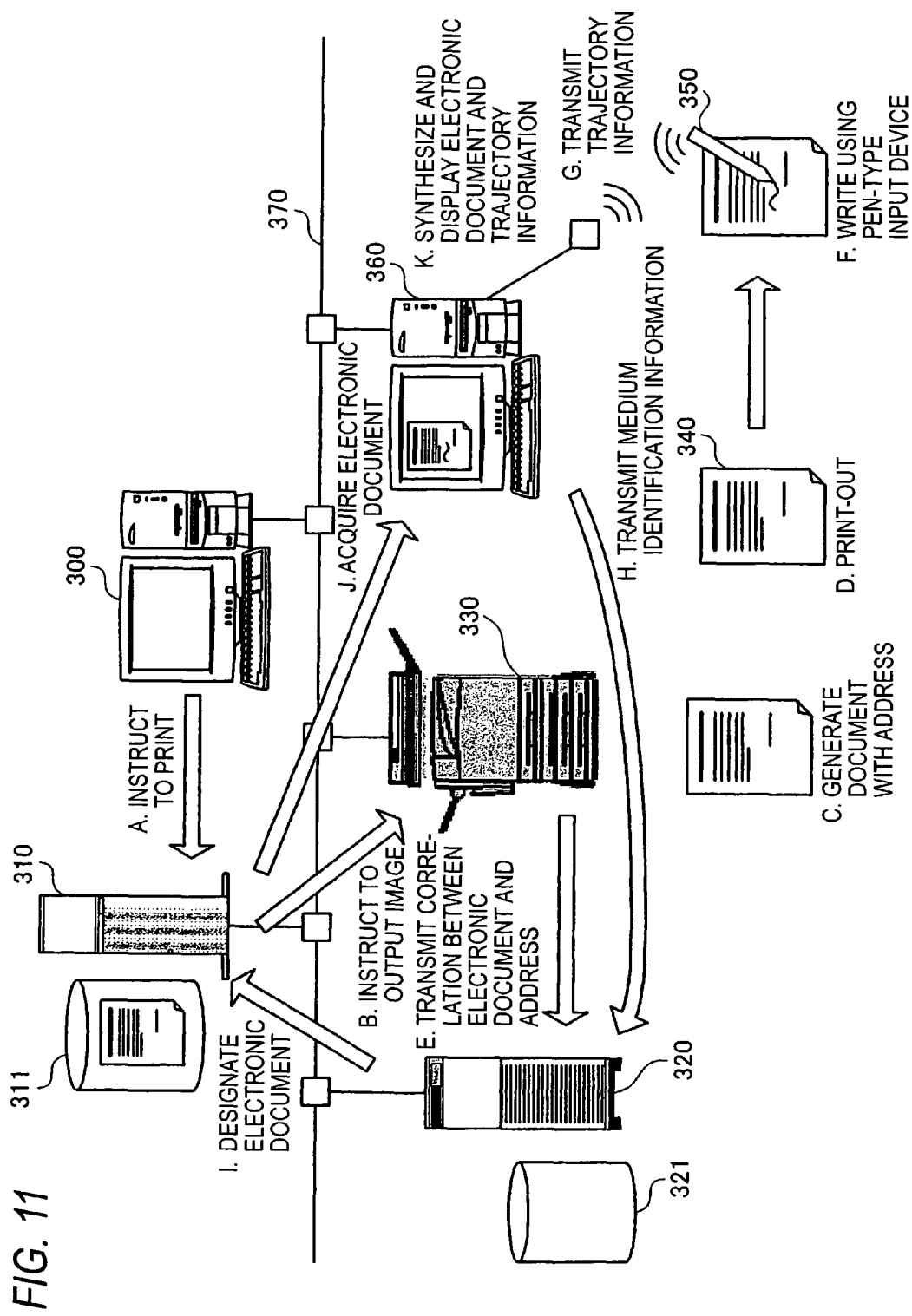
FIG. 11 is a diagram showing another configuration of an electronic document management system.

FIG. 11 shows another configuration of an electronic document management system. The system shown in FIG. 11 includes a terminal 300 that instructs to print electronic documents, a document management server 310 that manages the electronic documents to be printed, an address-embedded document generating server 320 that imparts address information (including medium identification information) to the electronic documents to be printed, and an image forming device 330 (printing device) that prints the electronic documents after the addresses are imparted. The terminal 300, the document management server 310, the address-embedded document generating server 320, and the image forming device 330 are connected to a network 370. Also, the document management server 310 is connected to the repository 311 that the electronic documents. Also, the address-embedded document generating server 320 is connected to an address information DB (database) 321 that manages address information. Also, the system includes an address-embedded paper (medium) 340 that is printed out by the image forming device 330, and a pen-type input device 350 that records characters or figures on the address-embedded paper 340 and reads information concerning the characters or figures. Also, the network 370 is connected to a terminal 360 that overlaps and displays the documents managed by the document management server 310 and records information read by the pen-type input device 350.

The operation of the system will now be descried.

The terminal 300 instructs the document management server 310 to print a specified electronic document stored in the repository 311 (A). Accordingly, the document management server 310 outputs the print instruction to the image forming device 330 (B). The image forming device 330 generates an address-embedded document (C) and outputs an address-embedded paper 340 (D). On the other hand, the image forming device 330 transmits information concerning the correlation between the electronic documents to be printed and address information (including medium identification information) to the address-embedded document generating server 320 (E). The address-embedded document generating server 320 receives the information and stores the information concerning the correlation between the electronic documents and the addresses in the address information DB 321.

Here, the address information to be imparted includes coordinate information (X-coordinate and Y-coordinate) for specifying the position on the paper. Also, the address information includes medium specification information for uniquely specifying a paper to be outputted. As the medium identification information, print-out time acquired from the image forming device 330, a machine ID of the image forming device 330, a count value of an output, and the like are used.

On the paper printed out by the image forming device 330, the code image as shown in FIGS. 2A to 2C is formed on the image (character, figure, photo, or the like) from the electronic document, for example, using the non-visible toner. Next, the user writes on the printed paper using the pen-type input device 350 (F), as shown in FIG. 7. Trajectory information generated by writing and the medium identification information recognized by the pen-type input device 350 are transmitted to the terminal 360 (G). The terminal 360 transmits the received medium identification information to the document generating server 320 (H). The document generating server 320 specifies the electronic document using the information stored in the address information DB 321. The document generating server 320 designates the electronic document to the document management server 310 (I). Accordingly, the electronic document stored in the repository 311 is provided to the terminal 360. The terminal 360 acquires original data of the electronic document, on which the user writes using the pen-type input device 350 (J). The terminal 360 synthesizes and displays on the display device the electronic document and the trajectory information (K).

As apparent from the above description, according to the present embodiment of the present invention, the code images generated from the same electronic document are different from one another, if the printed mediums are different from one another. That is, when plural copies of the same page of the same electronic document is printed, different identification information (information for uniquely specifying the medium) can be provided for each medium. Also, it is possible to expand theoretically infinite addresses on the medium by generating the code image including the information for uniquely specifying the medium and the address information.

In addition, according to the present embodiment of the present invention, it is possible to manage the documents based on the correlation between the address space used in the output medium and the original document with respect to each output medium to be printed. Therefore, for example, when plural copies of electronic document having the same image are printed, it is possible to identify and manage an input performed by the user using the pen-type input device 50 (the pen-type input device 170, the pen-type input device 350) with respect to each medium, since the respective mediums have different address spaces.

Also, the management according to the present embodiment is excellent in that it is not necessary to use a previously recorded paper. In addition, since it is not necessary to use an address space previously assigned by an address management device that manages the entire addresses collectively, it is possible to provide a convenient electronic document management system.

The address information may be information corresponding to a region of the document image of the electronic document. Moreover, the term 'electronic document' is not limited to text information but includes information about figures or photos.

The code information generation unit may generate the code information at the time of printing of the printing unit. The code information generation unit may generate code information including identification information thereof and time information concerning printed time. The code information generation unit may generate code information including identification information thereof and information concerning a print sequence of a printed medium. The code information generation unit may cause the information for uniquely specifying the electronic document to be included in the code information. Accordingly, in the present invention, for example, when the code information is read by an electronic pen, it is possible to expand an address of an infinite position, which may be excellent over a related art technique in which a finite address assigned by a specified company in advance is expanded.

The printing device may further include a specification information acquisition unit which acquires information for uniquely specifying the medium from outside, and an electronic document information output unit outputting the information for specifying the electronic document printed by the printing unit to the outside.

The electronic document management system may further include a code reading unit that reads a code image printed on a medium by the printing unit, and a communication unit that outputs information concerning the read code image.

The communication unit may output information concerning the read code image to the electronic document management unit. In this case, it is possible to manage the correlation between the address, which represents an infinite position, and the document image of the electronic document.

The code reading unit may detect an operation of a user on the surface of the medium and reads the code image on the position specified by the operation of the user.

Also, the identification information may include device identification information for uniquely identifying a device printing the electronic document, information concerning the number of count of the device, or time information concerning printed time of the medium. In this case, it may be possible to specify the medium simply and easily.

The identification information in the second image may be information generated when an image is printed on the medium.

Also, the information for specifying the medium in the second image may include at least one of device identification information concerning the device printing the electronic document, information concerning the number of count of the device, and time information concerning printed time of the medium.

Also, the non-visible image forming the second image may be formed by a non-visible toner having an absorption ratio of at least 20% or more in a near-infrared region.

Also, if the first image is a photo image, the second image may not be formed on the photo image. In this case, a position at which the photo image is preferably not contaminated may be prevented from being contaminated due to the second image.

The print processing-method may further include overlapping and printing the generated code image and the document image on the surface of the medium.

In addition, the print processing method may include reading the code image printed on the medium, and restoring the read code image and outputting identification information for uniquely specifying the medium included in the restored code image.

Here, the program can be provided to a computer through a medium such as the CD-ROM or the DVD-ROM, or can be provided from a remote program transmitting device to the computer via a network, such as Internet or the like. Further, the program is stored, for example, in a memory in the computer of a printing device or a document management device, and is executed by a CPU of the computer.

Moreover, according to the present invention, it is possible to dynamically generate information for uniquely specifying address information or a medium. The term 'dynamically generating' implies that the address information is determined from the size of the medium printed whenever the print instruction is issued, unlike the related art in which an address is previously assigned. Also, the address information generated by the address information generation unit may be reset at least for each job.

That is, according to an embodiment of the present invention, the code images generated from the same electronic document are different from each other, if the printed mediums are different from each other. Also, it is possible to expand a theoretically infinite address on a medium by generating a code image including information for uniquely specifying the medium and address information.

According to an embodiment of the present invention, it is possible to print different medium specification information concerning each medium, even when plural copies of a document image of an electronic document are s printed.

The entire disclosure of Japanese Patent Application No. 2005-152527 filed on May 25, 2005 including specification, claims, drawings and abstract is incorporated herein by reference in its entirety.

What is claimed is:

1. A printing device, comprising:
   an electronic document acquisition unit that acquires an electronic document to be printed on a medium;
   a code information generation unit that generates code information, wherein the code information is formed by combining identification information that uniquely specifies the instant medium and address information that is generated over the medium and identifies a set of positional codes each indicating a position on a surface of the medium, wherein the address information used for the electronic document is reset to assign for another electronic document;
   a storage unit that stores the address information of each electronic document;
   a code image generation unit that converts the code information into a print image to generate a code image;
   a document image generation unit that generates the document image from the electronic document; and
   a printing unit that prints the generated code image and the document image on a surface of the medium,
   wherein the identification information is combined information of both printing device identification information for identifying the printing device and a count number of papers counted by a counter of the printing device.

2. The printing device according to claim 1, wherein the code information generation unit generates the code information at the time of printing.

3. The printing device according to claim 1, further comprising:
   an information output unit that outputs information which specifies the electronic document printed by the printing unit to the external devices.

4. The printing device according to claim 1, wherein the address information corresponds to the document image region of the electronic document.

5. The printing device according to claim 1,
   wherein a same address value is assigned to start addresses of the address information among respective printing jobs.

6. An electronic document management system, comprising:
   a print instruction unit that issues a print instruction to print an electronic document;
   a code image generation unit that generates code image for a separate medium, wherein the code image is formed by combining address information and identification information, the identification information uniquely specifies the instant medium and the address information is generated over the medium and specifies a set of positional codes each indicating a position on a surface of the medium, and the address information used for the electronic document is reset to assign for another electronic document, and
   wherein the code image is generated at the time the medium is being printed and a document image of the electronic document is printed on the surface of the medium;
   a document image generation unit that generates the document image from the input electronic document;
   a printing unit that prints the generated code image and the generated document image on the surface of the medium;
   an electronic document mamagement unit that manages a correlation between the identification information generated by the code image generation unit and the electronic document; and
   a storage unit that stores the address information of each electronic document and accumulates correlation information managed by the electronic document management unit,
   wherein the identification information is combined information of both printing device identification information for identifying the printing device and a count number of papers counted by a counter of the printing device.

7. The electronic document management system according to claim 6, further comprising:
   a code reading unit that reads the code image printed on the medium; and
   a communication unit that outputs the code image information read by the code reading unit.

8. The electronic document management system according to claim 7, wherein the communication unit outputs the code image information read by the code reading unit to the electronic document management unit.

9. The electronic document management system according to claim 7, wherein the code reading unit detects user operation on the surface of the medium and reads a code image at a position specified by the operation of the user.

10. A print processing method of printing a document image of an electronic document, the print processing method comprising:
    generating an identification information that uniquely specifics a medium when the document image is printed on the medium;
    generating code image, the code image is formed by combining the generated identification information and address information, the address information generated over the medium identifies an address of the medium and specifies a set of positional codes each indicating a position on a surface of the medium wherein the address information used for the electronic document is reset to assign for another electronic document; and
    storing the address information of each electronic document and information concerning a correlation between the identification information included in the code image and the electronic document,
    wherein identification information uniquely specifies the medium, and
    wherein the identification information is combined information of both printing device identification information for identifying the printing device and a count number of papers counted by a counter of the printing device.

11. The print processing method according to claim 10, further comprising:

printing the generated code image and the document image by overlapping on the surface of the medium.

12. The print processing method according to claim 11, further comprising:
reading the code image printed on the medium;
restoring the code image; and
outputting the identification information included in the restored code image, wherein the identification information uniquely specifies the medium.

13. A storage medium readable by a computer, the storage medium storing instructions executable by the computer to perform a print processing function, the function comprising the steps of:
receiving instruction to print an electronic document;
generating identification information that uniquely specifies the electronic document when a document image of the electronic document is printed;
generating code image that is formed by combining address information and the identification information, the address information generated over a medium identifies an address of the medium and specifies a set of positional codes each indicating a position on a surface of the medium wherein the address information used for the electronic document is reset to assign for another electronic document, such that the document image is fit to a size of the medium when printed on the medium; and
storing the address information of each electronic document and information concerning a correlation between the identification information included in the code image and the electronic document,
wherein identification information uniquely specifies the medium, and
wherein the identification information is combined information of both printing device identification information for identifying the printing device and a count number of papers counted by a counter of the printing device.

* * * * *